(12) United States Patent
McNicol et al.

(10) Patent No.: US 7,382,984 B2
(45) Date of Patent: Jun. 3, 2008

(54) ELECTRICAL DOMAIN COMPENSATION OF OPTICAL DISPERSION IN AN OPTICAL COMMUNICATIONS SYSTEM

(75) Inventors: John McNicol, Ottawa (CA); Kieran Parsons, Ottawa (CA); Leo Strawczynski, Ottawa (CA); Kim B. Roberts, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 974 days.

(21) Appl. No.: 10/262,944

(22) Filed: Oct. 3, 2002

(65) Prior Publication Data

US 2004/0067064 A1 Apr. 8, 2004

(51) Int. Cl.
*H04B 10/12* (2006.01)
*H04B 10/00* (2006.01)
*H04B 10/04* (2006.01)

(52) U.S. Cl. .................... 398/147; 398/159; 398/194

(58) Field of Classification Search ........ 398/132–193, 398/194, 195–198; 372/28–39
See application file for complete search history.

(56) References Cited

U.S. PATENT DOCUMENTS

| | | | | |
|---|---|---|---|---|
| 5,060,310 A | * | 10/1991 | Frisch et al. ................. | 398/193 |
| 5,148,503 A | | 9/1992 | Skeie ............................ | 385/3 |
| 5,161,044 A | * | 11/1992 | Nazarathy et al. ........... | 398/194 |
| 5,291,289 A | * | 3/1994 | Hulyalkar et al. ........... | 348/723 |
| 5,311,346 A | | 5/1994 | Haas et al. ................... | 359/156 |
| 5,349,312 A | | 9/1994 | Huettner et al. | |
| 5,408,498 A | | 4/1995 | Yoshida ........................ | 375/286 |
| 5,416,626 A | | 5/1995 | Taylor .......................... | 359/156 |
| 5,446,574 A | | 8/1995 | Djupsjobacka et al. | |
| 5,513,029 A | | 4/1996 | Roberts ....................... | 359/177 |
| 5,579,328 A | | 11/1996 | Habel et al. .................. | 372/31 |
| 5,761,225 A | | 6/1998 | Fidric et al. .................. | 372/6 |
| 5,764,704 A | * | 6/1998 | Shenoi ......................... | 375/324 |

(Continued)

FOREIGN PATENT DOCUMENTS

EP 0 524 758 1/1993

(Continued)

OTHER PUBLICATIONS

Sadhwani, Ram et al "Adaptive CMOS Predistortion Linearizer for Fiber-Optic Links", Journal of Lightwave Technology, Dec. 2003, pp. 3180-3193, vol. 21, No. 12., U.S.A.

(Continued)

*Primary Examiner*—Dalzid Singh
(74) *Attorney, Agent, or Firm*—Kent Daniels; Ogilvy Renault LLP

(57) ABSTRACT

Optical dispersion imposed on a communications signal conveyed through an optical communications system is compensated by modulating the communications signal in the electrical domain. A compensation function is determined that substantially mitigates the chromatic dispersion. The communications signal is then modulated in the electrical domain using the compensation function. Electrical domain compensation can be implemented in either the transmitter or the receiver end of the communications system. In preferred embodiments, compensation is implemented in the transmitter, using a look-up-table and digital-to-analog converter to generate an electrical predistorted signal. The electrical predistorted signal is then used to modulate an optical source to generate a corresponding predistorted optical signal for transmission through the optical communications system.

31 Claims, 6 Drawing Sheets

U.S. PATENT DOCUMENTS

| | | | | |
|---|---|---|---|---|
| 5,892,858 | A | 4/1999 | Vaziri et al. | 385/2 |
| 5,949,560 | A | 9/1999 | Roberts et al. | 359/110 |
| 5,999,258 | A | 12/1999 | Roberts | 356/345 |
| 5,999,300 | A * | 12/1999 | Davies et al. | 398/185 |
| 6,016,374 | A * | 1/2000 | Adams et al. | 385/24 |
| 6,067,180 | A | 5/2000 | Roberts | 359/110 |
| 6,115,162 | A | 9/2000 | Graves et al. | 359/173 |
| 6,124,960 | A | 9/2000 | Garthe et al. | 359/181 |
| 6,128,111 | A | 10/2000 | Roberts | 359/110 |
| 6,205,262 | B1 | 3/2001 | Shen | 385/11 |
| 6,262,834 | B1 | 7/2001 | Nichols et al. | 359/301 |
| 6,304,369 | B1 | 10/2001 | Piehler | 359/337.4 |
| 6,441,932 | B1 | 8/2002 | Helkey | 359/110 |
| 6,473,013 | B1 | 10/2002 | Velazquez et al. | 341/120 |
| 6,529,305 | B1 * | 3/2003 | Meeker et al. | 398/158 |
| 6,559,994 | B1 | 5/2003 | Chen et al. | 359/180 |
| 6,580,532 | B1 | 6/2003 | Yao et al. | 359/111 |
| 6,647,176 | B1 * | 11/2003 | Pua et al. | 385/24 |
| 6,654,105 | B2 * | 11/2003 | Wang et al. | 356/73.1 |
| 6,687,466 | B1 * | 2/2004 | Chiappetta | 398/193 |
| 2001/0028760 | A1 | 10/2001 | Yaffe | |
| 2002/0018268 | A1 | 2/2002 | Price et al. | |
| 2002/0024694 | A1 | 2/2002 | Newell et al. | |
| 2002/0060827 | A1 * | 5/2002 | Agazzi | 359/161 |
| 2002/0106148 | A1 | 8/2002 | Schemmann et al. | |
| 2003/0011847 | A1 | 1/2003 | Dai Fa et al. | |

FOREIGN PATENT DOCUMENTS

| | | |
|---|---|---|
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Andre, P.S. et al "Extraction of DFB Laser Rate Equations Parameters for Optical Simulation Purposes", Conftele 99 ISBN 972-98115-0-4, pp. 561-564.

Illing, Lucas et al "Shaping current waveforms for direct modulation of semiconductor lasers", Institute for Nonlinear Science, 2003, San Diego, U.S.A.

Watts, P.M. et al "Demonstration of Electrical Dispersion Compensation of Single Sideband Optical Transmission", Optical Networks Group, Dept. of Electronic and Electrical Engineering, University College London, Torrington Place, London.

Kim, Hoon et al "10 Gbit/s 177 km transmission over conventional singlemode fibre using a vestigial side-band modulation format", Electronics Letters, Dec. 6, 2001, pp. 1533-1534, vol. 37, No. 25.

Bulow, Henning et al "Dispersion Mitigation Using a Fiber-Bragg-Grating Sideband Filter and a Tunable Electronic Equalizer", WDD34, pp. 1-4.

Sieben, M. et al "10Gbit/s optical single sideband system", Electronics Letters, May 22, 1997, pp. 971-973, vol. 33, No. 11.

Schaffer, Troy A. et al "A 2GHz 12-bit Digital-to-Analog Converter for Direct Digital Synthesis Applications", GaAs IC Symposium, pp. 61-64.

Kamoto, T. et al "An 8-bit 2-ns Monolithic DAC", IEEE Journal of Solid-State Circuits, Feb. 1988, vol. 23, No. 1.

Feldhaus, G: "Volterra Equalizer for Electrical for Electrical Compensation of Dispersion and Fiber Nonlinearities", Journal of Optical Communications, Fachverlag Schiele & Schon, Berlin, De, vol. 23, No. 3, Jun. 2002, pp. 82-84, XP001130377, ISSN: 0173-4911.

H. Gysel et al. "Electrical Predistortion to Compensate for Combined Effect of Laser Chirp and Fibre Dispersion", Electronics Letters IEE Stevenage vol. 27, No. 5, Feb. 1991, pp. 421-423, GB.

A. Mecozzi et al. "Cancellation of timing and Amplitude Jitter in Symmetric Links Using Highly Dispersed Pulses", IEEE Photonics Technology Letters, vol. 13, No. 5, May 2001, pp. 445-447, USA.

"Dispersion Compensation by Active Predistorted Signal Synthesis"—Thomas L. Koch and Rod C. Alferness Journal of Lightwave Technology, vol. LT-3, No. 4, Aug. 1985.

Performance of Smart Lightwave Receivers With Linear Equalization 1992 IEEE—Journal of Lightwave Technology, Vo. 10, No. 8—John C. Cartledge, Member, IEEE; Ross G. McKay, Student-Member, IEEE; and Mark C. Nowell.

Electrical Signal Processing Techniques in Long-Haul Fiber-Optic Systems 1990 IEEE—Transactions on Communications, vol. 38, No. 9—Jack H. Winters, Senior Member, IEEE; and Richard D. Gitlin, Fellow, IEEE.

Reduction of Dispersion-Induced Distortion in SCM Transmission Systems by Using Predistortion-Linearized MQW-EA Modulators 1997 IEEE—Journal of Lightwave Technology, vol. 15, No. 2—Takanori Iwai, Member, IEEE; Kenji Sato, and Ko-ichi Suto, Member, IEEE.

Mitigation of Dispersion-Induced Effects Using SOA in Analog Optical Transmission 2002 IEEE—IEEE Photonics Technology Letters, vol. 14, No. 8—Duk-Ho Jeon, Hyun-Do Jung, Student Member, IEEE; and Sang-Kook Han, Member, IEEE.

Signal Distortion and Noise in AM-SCM Transmission Systems Employing the Feedforward Linearized MQW-EA External Modulator 1995 IEEE—Journal of Lightwave Technology, vol. 13, No. 8—Takanori Iwai, Member, IEEE; Kenji Sato, and Ko-ichi Suto, Member, IEEE.

Predistortion techniques for linearization of external modulators 1999 IEEE—Gordon Wilson, Lucent Technologies, NJ 07733, U.S.A.

Adaptive Electronic Linearization of Fiber Optic Links, OFC 2003, vol. 2, pp. 477-480, Mar. 2003 Sadhwani et al.

Automated Measurement of Polarization Mode Dispersion Using Jones Matrix Eigenanalysis, IEE Photonics Technology Letters, vol. 4, No. 9, pp. 1066-1069, Sep. 1992, Heffner.

Chromatic Dispersion Mapping by Sensing the Power Distribution of Four-Wave Mixing Along the Fiber Using Brillouin Probing, OFC 2003, vol. 2, pp. 714-716, Herraez et al.

Design of Broad-Band PMD Compensation Filters, IEEE Photonics Technology Letters vol. 14, No. 8, Aug. 2002, A. Eyal et al.

Dispersion Compensation with an SBS-Suppressed Fiber Phase Conjugator Using Synchronized Phase Modulation, OFC 2003, vol. 2, pp. 716-717, M. Tani.

Exact Compensation for both Chromatic Dispersion and Kerr Effect in a Transmission Fiber Using Optical Phase Conjuction, Journal of Lightwave Technology, vol. 14, No. 3, Mar. 1996, Watanabe et al.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Scott et al.

Measurement of High-Order Polarization Mode Dispersion, IEEE Photonics Technology Letters, vol. 12, No. 7, Jul. 2000, Yi Li et al.

Polarization Effects in Lightwave Systems, Craig D. Poole and Jonathan Nage. Date unknown.

Polarization Modulated Direct Detection Optical Transmission Systesm, Journal of Lightwave Technology, vol. 10, No. 12, Dec. 1992.

Predistortion of Electroabsorption Modulators for Analog CATV Systems at 1.55 •m, Journal of Lightwave Technology, vol. 15, No. 9, Sep. 1997, Gordon C. Wilson et al.

Representation of Second-Order Polarisation Mode Dispersion, Electronics Letters, vol. 35, No. 19, Sep. 16, 1999, A. Eyal et al.

Soliton Transmission Using Periodic Dispersion Compensation, Journal of Lightwave Technology, vol. 15, No. 10, Oct. 1997, Nicholas J. Smith et al.

Theoretical Basis of Polarization Mode Dispersion Equalization up to the Second Order, Journal of Lightwave Technology, vol. 18, No. 4, Apr. 2000, Teruhiko Kudou et al.

\* cited by examiner

ELECTRICAL DOMAIN COMPENSATION OF OPTICAL DISPERSION IN AN OPTICAL COMMUNICATIONS SYSTEM

CROSS-REFERENCE TO RELATED APPLICATIONS

This is the first application filed for the present invention.

MICROFICHE APPENDIX

Not Applicable.

TECHNICAL FIELD

The present invention relates to optical communications systems, and in particular to electrical domain compensation of optical dispersion in an optical communications system.

BACKGROUND OF THE INVENTION

Optical communications systems typically include a pair of network nodes connected by an optical waveguide (i.e., fiber) link. Within each network node, communications signals are converted into electrical signals for signal regeneration and/or routing, and converted into optical signals for transmission through an optical link to another node. The optical link between the network nodes is typically made up of multiple concatenated optical components, including one or more (and possibly 20 or more) optical fiber spans (e.g., of 40-150 km in length) interconnected by optical amplifiers.

The use of concatenated optical components within a link enables improved signal reach (that is, the distance that an optical signal can be conveyed before being reconverted into electrical form for regeneration). Thus, for example, optical signals are progressively attenuated as they propagate through a span, and amplified by an optical amplifier (e.g., an Erbium Doped Fiber Amplifier—EDFA) prior to being launched into the next span. However, signal degradation due to noise and dispersion effects increase as the signal propagates through the fiber. Consequently, noise and dispersion degradation become significant limiting factors of the maximum possible signal reach.

Dispersion, also known as Group Velocity Dispersion or Chromatic Dispersion, in single mode fibre at least, occurs as a result of two mechanisms:
  a) Waveguide dispersion—within a single mode fibre, different wavelengths travel along the fibre at different speeds; and
  b) Material dispersion—the phase velocity of plane waves in glass varies with wavelength.

For the purposes of the present invention, references to "dispersion" shall be understood to mean the sum total of group velocity dispersion effects.

Mathematically, first order dispersion is the derivative of the time delay of the optical path with respect to wavelength. The effect of dispersion is measured in picoseconds arrival time spread per nanometre 'line width' per kilometre length (ps nm$^{-1}$ km$^{-1}$). The magnitude of waveguide and material dispersions both vary with wavelength, and at some wavelengths the two effects act in opposite senses. The amount of dispersion present in a link can also vary with the temperature of the cable, and if the route is changed (e.g., using optical switches). Dispersion in optical fibre presents serious problems when using light sources whose spectrum is non-ideal, for example broad or multispectral-line, or when high data rates are required, e.g., over 2 GB/s.

For the purposes of analyzing the effects of dispersion, it is convenient to represent an optical communications system using the block diagram of FIG. 1. In this case, the transmitter is represented by an electrical-to-optical converter (E/O) 2 which operates to convert an electrical input signal x(t) into a corresponding optical signal $X_{OPT}(w)$ for transmission to the receiver. The optical fiber span 4, including all concatenated components, is represented by a transfer function H(w), which will normally be complex. The Receiver is represented by an optical-to-electrical converter (O/E) 6 which detects the optical signal $Y_{OPT}(w)$ received through the optical fiber span 4, and generates a corresponding output signal y(t). For a linear optical channel, the received optical signal $Y_{OPT}(w)$ will nominally be equivalent to the product of $X_{OPT}(w)$ and H(w).

In general, the output signal y(t) represents a distorted version of the input data signal x(t). While it would be highly desirable for H(w)≈1, this is rarely the case. Accordingly, it is frequently necessary to utilize at least some form of compensation, so that the original input data signal x(t) can be detected within the distorted output signal y(t).

One commonly used method of addressing the problem of dispersion in high-bandwidth communications systems is by inserting one or more optical dispersion compensators 8, represented in FIG. 1b by the compensation function C(w), within the link. Such dispersion compensators may, for example, take the form of length of fibre, a Mach Zehnder interferometer, an optical resonator, or a Bragg reflector. Some of these compensators can also produce a controllable amount of compensation, which enables mitigation of time-variant dispersion effects. In either case, these compensators are intended to at least partially offset the signal distortions introduced by the system transfer function H(w). The compensation function C(w) is a dispersive function that is selected to optimize performance of the link. In a fully linear system, the compensation function C(w) would preferably be equivalent to the complex conjugate H*(w) of the transfer function H(w), in which case H(w)*C(w)=1, and the combined effect of H(w) and C(w)=H*(w) would be an undistorted received signal $Y_{OPT}(w)$ that exactly corresponds to the original optical signal $X_{OPT}(w)$. However, limitations of optical components, and the time-varying amount of compensation required, make this objective very difficult to achieve. Additionally, optical compensators are expensive and introduce significant optical losses. These losses must be offset by means of additional optical gain which introduces more optical noise. The additional (or higher-performance) optical amplifiers required to provide this increased gain further increases the total cost of the communications system. In addition, the presence of optical dispersion compensators and high performance amplifiers distributed along the length of the link provides a significant technical barrier to system evolution. For example, implementation of optical switching (e.g. at the Tx and/or Rx ends of the link, or an intermediate site without electrical termination) necessarily requires adjustment of optical amplifiers, in order to accommodate changing energy states within the link.

These problems can be alleviated by moving the compensation function to the terminal ends (e.g., the transmitter 2 and/or receiver 6) of the link. This technique typically involves "preprocessing" the input signal x(t) at the transmitter (Tx) end of the link 4 to improve dispersion tolerance, and/or processing the output signal y(t) detected at the receiver (Rx) end of the link to accurately detect the input signal x(t) within the distorted output signal y(t).

For example, high bandwidth traffic can be distributed over a larger number of lower-rate channels. The reduced bit-rate of each channel enhances the dispersion tolerance in proportion to the square of the reduction in the bit-rate. However, this approach is expensive, spectrally inefficient, and creates four wave mixing problems.

Dispersion tolerance can be increased by narrowing the spectrum of the transmitted optical signal. Various known techniques may be used for this purpose, such as multilevel coding. However, this requires expensive electronics and significantly reduces the noise tolerance of the communications system.

Subcarrier multiplexing, which involves transmitting a plurality of lower bit-rate signals over one optical carrier, is another known method of increasing dispersion tolerance. In this case, the dispersion tolerance obtained is equivalent to that of the lower bit-rate subcarrier. However this approach is not cost effective and does not have a good noise tolerance.

The optical spectrum occupied by a signal can be reduced by use of modulators with reduced chirp, such as a Mach-Zehnder modulator. The amount of chirp can even be tailored to optimize transmission over a particular moderate amount of dispersion. One variation of this technique is referred to as dispersion supported transmission, an example of which is discussed in EP-A-0643 497. In this case, dispersion produces an FM to AM conversion effect, which can facilitate bit detection and thereby extend transmission distance without controlling or compensating dispersion. The dispersion causes shifting of adjacent signal components of different wavelengths, resulting in either energy voids or energy overlaps at the bit transitions. Constructive interference in an overlap causes a positive peak in the optical signal, while a void produces a negative peak. In principle, these positive and negative peaks represent an AM signal which may be detected to reproduce the original bit stream. This has proved difficult to implement over a reasonable range of practical link dispersions.

Many transmission formats are known that enable somewhat increased dispersion tolerance, for example, as described in U.S. Pat. No. 5,892,858. However none of these formats provide sufficient dispersion tolerance to allow a wide bandwidth signal to be accurately detected in the presence of large amounts of dispersion.

It is known that the use of a coherent receiver enables the signal degradation due to dispersion to be removed via linear electrical filtering. However, because of their high cost, very few coherent optical receivers have been installed, and the cost of replacing installed receivers with the high-performance coherent receivers is prohibitive.

The majority of receivers installed in modern optical communications networks are of the direct detection type. Due to the well known squaring effect in these receivers, electrical processing of the output signal y(t) is capable of compensating only a very limited amount of dispersion. See, for example, "*Performance of Smart Lightwave Receivers with Linear Equalization*" Cartledge et al, J Lightwave Tech, Vol. 10, No. 8, August 1992, pp.1105-1109; and "*Electrical Signal Processing Techniques in Long-Haul Fiber-Optic Systems*" Winters et al, IEEE Trans. Comms, Vol. 38, No. 9, September 1990, pp. 1439-1453}.

In addition to the squaring effect in conventional receivers, optical modulators also frequently display a non-linear performance characteristic. Nonlinearity compensation of modulators can be implemented in the electrical domain ("*Reduction of Dispersion-Induced Distortion in SCM Transmission Systems by using Predistortion-Linearized MQW-EA Modulators*", Iwai et al, J. Lightwave Tech., Vol. 15, No. 2, February 1997, pp. 169-177). It is also possible to provide the nonlinear compensation in the optical domain ("*Mitigation of Dispersion-Induced Effects using SOA in Analog Optical Transmission*", Jeon et al, IEEE Photonics Technology Letters, Vol. 14, No 8, August 2002, pp. 1166-1168 and "Predistortion Techniques for Linearization of External Modulators", Wilson, 1999 Digest of the LEOS Summer Topical Meetings, 1999, pp. IV39-IV40), or via hybrid optical/electrical domains ("*Signal Distortion and Noise in AM-SCM Transmission Systems employing the Feedforward Linearized MQW-EA External Modulator*", Iwai et al, J. Lightwave Tech., Vol. 13, No. 8, August 1995, pp. 1606-1612 and U.S. Pat. No. 5,148,503.

While modulator non-linearity can be compensated, the output signal y(t) detected at the Rx end of the communications system contains distortion components due to non-linearities in both the modulator (transmitter) 2 and the receiver 6, as well due to optical dispersion within the link 4. These distortions are compounded, one upon the other, and it is difficult to distinguish distortions of the output signal y(t) due to non-linearity of the modulator 2 or the receiver 6. It is also difficult to distinguish these effects from dispersion.

Accordingly, a cost-effective technique for mitigating the effects of dispersion on high bandwidth optical signals remains highly desirable.

SUMMARY OF THE INVENTION

Accordingly, an object of the present invention is to provide a technique for mitigating effects of dispersion on high bandwidth optical signals in an optical communications system.

An aspect of the present invention provides a method of compensating optical dispersion of a communications signal conveyed through an optical communications system. A compensation function is determined that substantially mitigates the chromatic dispersion imparted to the communications signal by the optical communications system. The communications signal is them modulated in the electrical domain using the compensation function.

The method of the invention can be implemented at either the Tx or Rx ends of the communications system, or may be divided between both ends, as desired. In cases where the method of the invention is implemented in the transmitter, the communication signal in the form of an input electrical signal (e.g. a substantially undistorted binary signal) is digitally filtered using the compensation function to generate a predistorted signal. The predistorted signal is then used to modulate an optical source to generate a corresponding predistorted optical signal for transmission through the optical communications system. This arrangement is particularly advantageous, because the predistorted signal can incorporate compensation for dispersion and component non-linearities throughout the system. Consequently, dispersion compensation can be effectively implemented independently of the type of detection (i.e. direct or coherent) used in the receiver.

In cases where the method of the invention is implemented in the receiver, the received optical signal is converted into a corresponding received electrical signal, which includes distortions due to dispersion imparted on the optical signal by the optical communications system. The received electrical signal is then sampled (e.g. using an analog-to-digital converter) and digitally filtered using the compensation function to generate an output electrical signal which is a substantially undistorted version of the original communications signal.

Thus the present invention compensates optical dispersion by digitally filtering a communications signal in the electrical domain. This filtering of the communications signal is governed in accordance with the required compensation function of the communications system transfer function and the non-linearity compensation required. With this arrangement, arbitrary optical dispersion imparted by the communications system can be compensated in such a manner that a comparatively undistorted output signal is generated at the receiving end of the communications system.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1A:
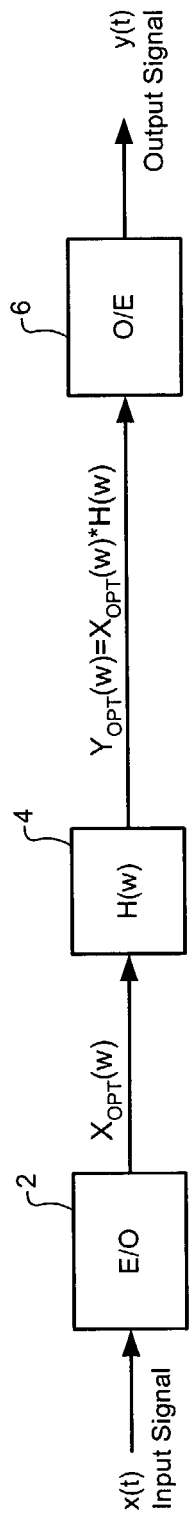
FIGS. 1a and 1b are block diagrams schematically illustrating transmission of an input data signal through a conventional optical communications system.
Figure 1B:
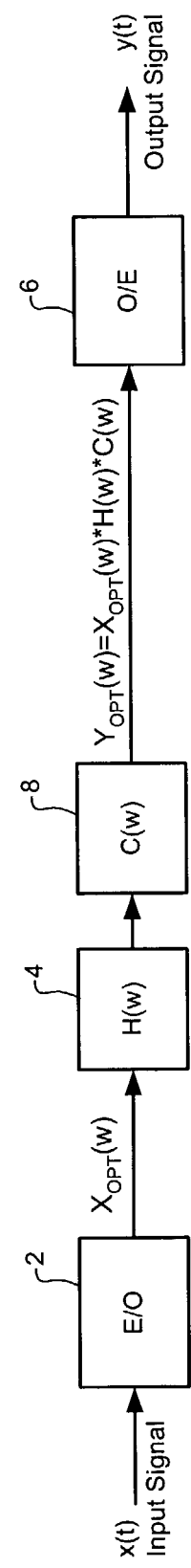
Figure 2A:
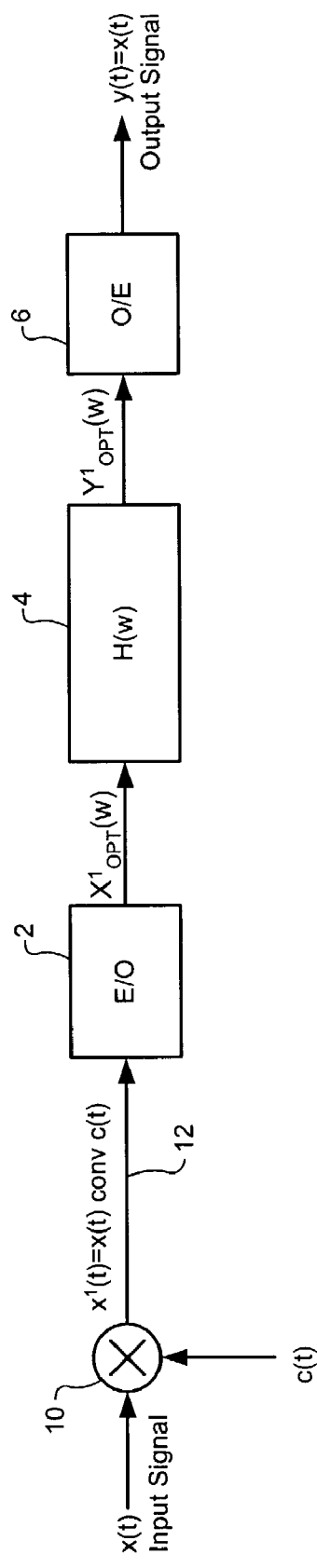
FIGS. 2a and 2b are block diagrams schematically illustrating transmission of an input data signal through an optical communications system in accordance with respective embodiments of the present invention.
Figure 2B:
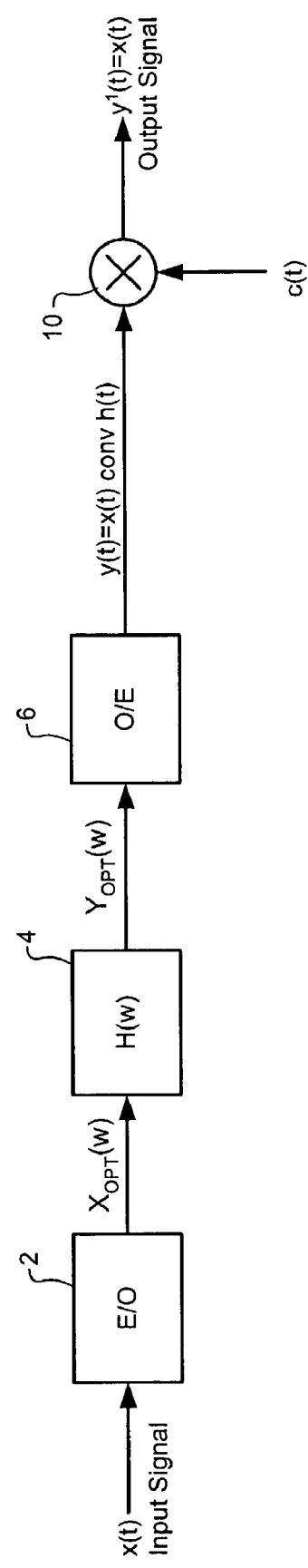

The present invention provides a method and system for compensation of chromatic dispersion in an optical communications system. FIGS. 2a and 2b are block diagrams schematically illustrating principal operations in accordance with the method of the present invention. FIG. 2a shows an embodiment in which dispersion compensation is implemented at the transmitting end of the communications system. Conversely, FIG. 2b illustrates an embodiment in which dispersion compensation is implemented at the receiving end of the communications system.

As shown in FIG. 2a, the optical communications system is represented by electrical-to-optical (E/O) and optical-to-electrical (O/E) converters 2 and 6 separated by an optical link 4 represented by a system transfer function H(w). In order to simplify the present description, the E/O and O/E converter blocks 2 and 6 shown in FIG. 2 are considered to be ideal, in the sense that they do not introduce any signal distortions that are not otherwise accounted for by the system transfer function H(w). In accordance with the present invention, signal distortions introduced by the system transfer function are compensated by deriving a compensation function c(t) that optimizes system performance. For chromatic dispersion, for example, the compensation function c(t) will be equivalent to the complex conjugate H*(w) of the system transfer function H(w). In non-linear systems, the compensation function c(t) will be non-linear, but in all cases, the compensation function is selected to optimize system performance. A compensation processor 10 uses the compensation function c(t) to filter the input signal x(t) in the electrical domain, thereby producing a predistorted input signal $x^1(t)$ 12 given by:

$$x^1(t) = x(t) \text{conv } c(t)$$

where "conv" is the convolution function.

The predistorted input signal $x^1(t)$ 12 is then converted to a corresponding predistorted optical signal $X^1_{OPT}(w)$ by the E/O converter 2 and transmitted through the optical link 4 to the receiver. Within the receiver, the incoming optical signal $Y^1_{OPT}(w)$ is converted by the O/E converter 6 into a corresponding output signal y(t). As may be seen in FIG. 2, the received optical signal $Y^1_{OPT}(w)$ is the predistorted optical signal $X^1_{OPT}(w)$ multiplied by the transfer function H(w) of the optical communications system. Because the distortions introduced by the compensation function c(t) exactly counterbalance those introduced by the system transfer function H(w), the output signal y(t) generated by the O/E converter will be a substantially undistorted version of the original input data signal x(t). Thus the present invention provides a technique of compensating optical distortions impressed upon optical signals traversing the optical link 4, by predistorting the input data signal x(t) within the electrical domain at the transmitting end of the optical link 4. Because distortion compensation is accomplished in the electrical domain, a substantially arbitrary compensation function c(t) can be implemented, thereby facilitating effective compensation of even severe optical dispersion.

Figure 3:
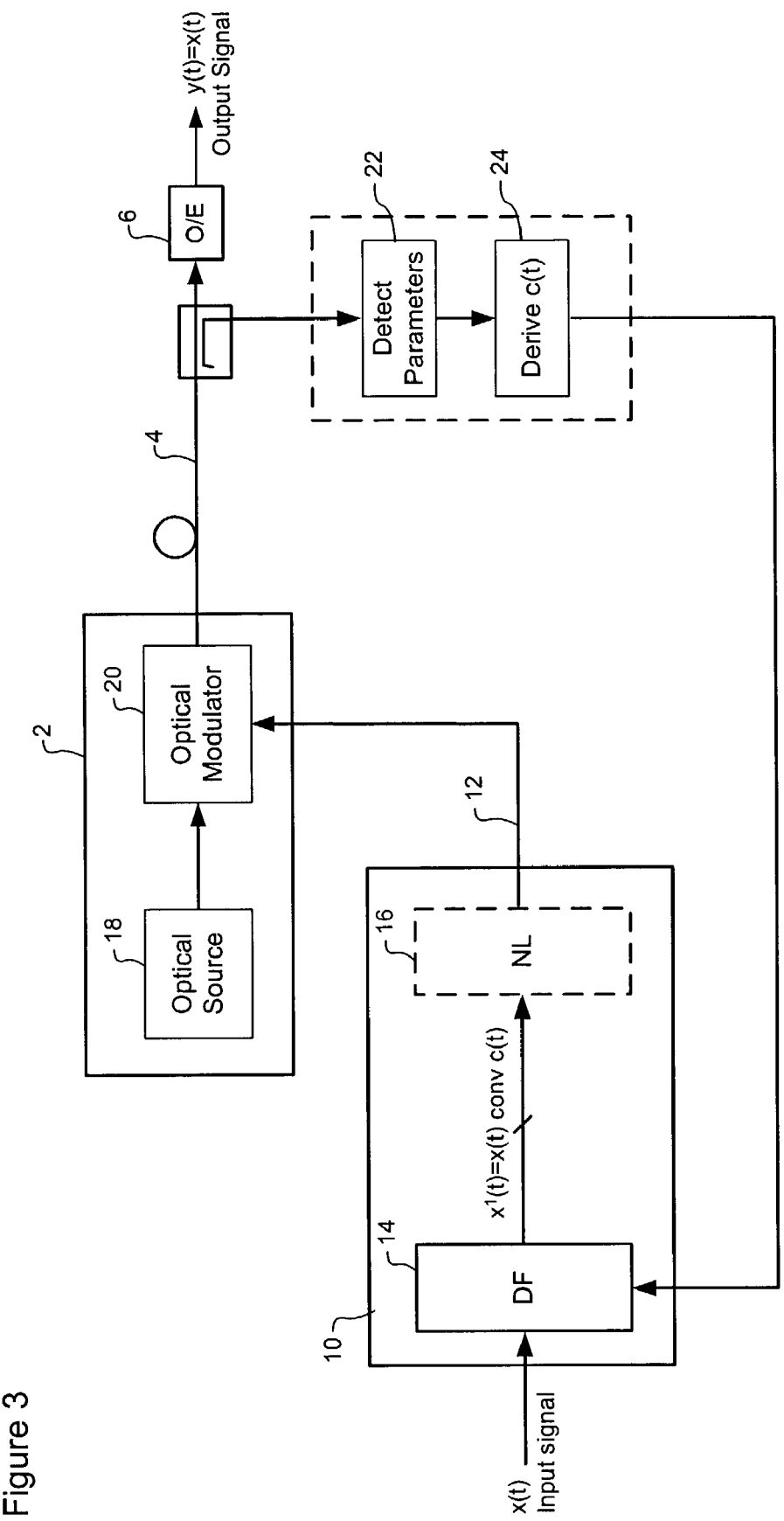
FIG. 3 is a block diagram schematically illustrating principal components and operations of a compensation processor in accordance with a first embodiment of the present invention.

FIG. 3 is a block diagram schematically illustrating principal elements and operations of a compensation processor 10 in accordance with a first embodiment of the present invention. As shown in FIG. 3, the input signal x(t) is filtered by a digital filter 14 which accepts the compensation function c(t) as an input. Various known digital filter types may be used to implement the digital filter 14, such as, for example, Finite Impulse Response (FIR) filters, Infinite Impulse Response (IIR) filters, and Fast Fourier Transform (FFT filters). Alternatively, the digital filter 14 may be implemented using a Random Access Memory Look-up Table (RAM LUT), as will be described in greater detail below. In either case, the digital filter 14 generates the predistorted signal $x^1(t)$ 12, which compensates chromatic dispersion due to the system transfer function H(w).

The predistorted signal $x^1(t)$ 12 can then be converted into the corresponding predistorted optical signal $X^1_{OPT}(w)$ by means of a conventional electrical to optical converter 2. For example, in the illustrated embodiment, electrical to optical conversion is accomplished using a tuned optical source 18 such as a narrow band laser coupled to a conventional optical modulator 20. In this case, the predistorted signal 12 can be used as an input to control the optical modulator 20 in a manner known in the art.

Various methods may be used to derive the compensation function c(t). In the example of FIG. 3, the optical signal $Y^1_{OPT}(w)$ at or near the receiver end of the optical link 4 is monitored (at 22) in order to detect signal quality parameters indicative of dispersion in the optical communications system. In preferred embodiments, the signal quality parameters comprise a direct measurement of dispersion as a function of wavelength across the wavelength band of interest. However, other signal quality parameters such as, for example, the bit error rate or eye closure may be used a proxies for the dispersion. Any of the signal quality parameters may be detected based on an optical signal obtained by tapping the optical link 4 (as shown by solid lines in FIG. 3), or alternatively by analysis of the output signal y(t) generated by the E/O converter 6 (as shown by the dashed line in FIG. 3). A compensation function c(t) which optimizes the detected parameters can then be derived (at 24) deterministically and/or adaptively, using known techniques. It should be noted that the functional step of deriving the compensation function c(t) can be implemented by any suitable combination of hardware and software, which may be co-located with the receiver, the transmitter, or any other location. In embodiments in which the detected parameters comprise direct measurement of dispersion, the compensation function c(t) can be calculated to minimize (and preferably eliminate) the total dispersion. Where bit error rate and/or eye closure are used as proxies, then the compensation function c(t) would be calculated to optimize these respective values.

In the foregoing discussion, the optical modulator 24 was assumed to be fully linear, so that the modulator 20 did not introduce any further distortions beyond those accounted for by the system transfer function H(w). Depending on how the system transfer function H(w) is defined, this approach may yield satisfactory results. However, in many cases it may be desirable to treat the transfer function of the optical fiber span 4 separately from that of the optical modulator 2 and the optical-to-electrical converter 6 in the receiver. In this case, the compensation function c(t) calculated above will not account for distortions introduced by the optical modulator 20 or the optical-to-electrical converter 6. However, the performance of these components is typically well characterized. It is therefore possible to implement a non-linear compensator 16 in order to further distort the predistorted signal 12 in such a manner as to fully compensate non-linearities of the optical modulator 20 and/or the O/E converter 6, as desired. The non-linear compensator 16 can be implemented as a nonlinear digital filter, such as an LUT or nonlinear multiplier.

Figure 4:
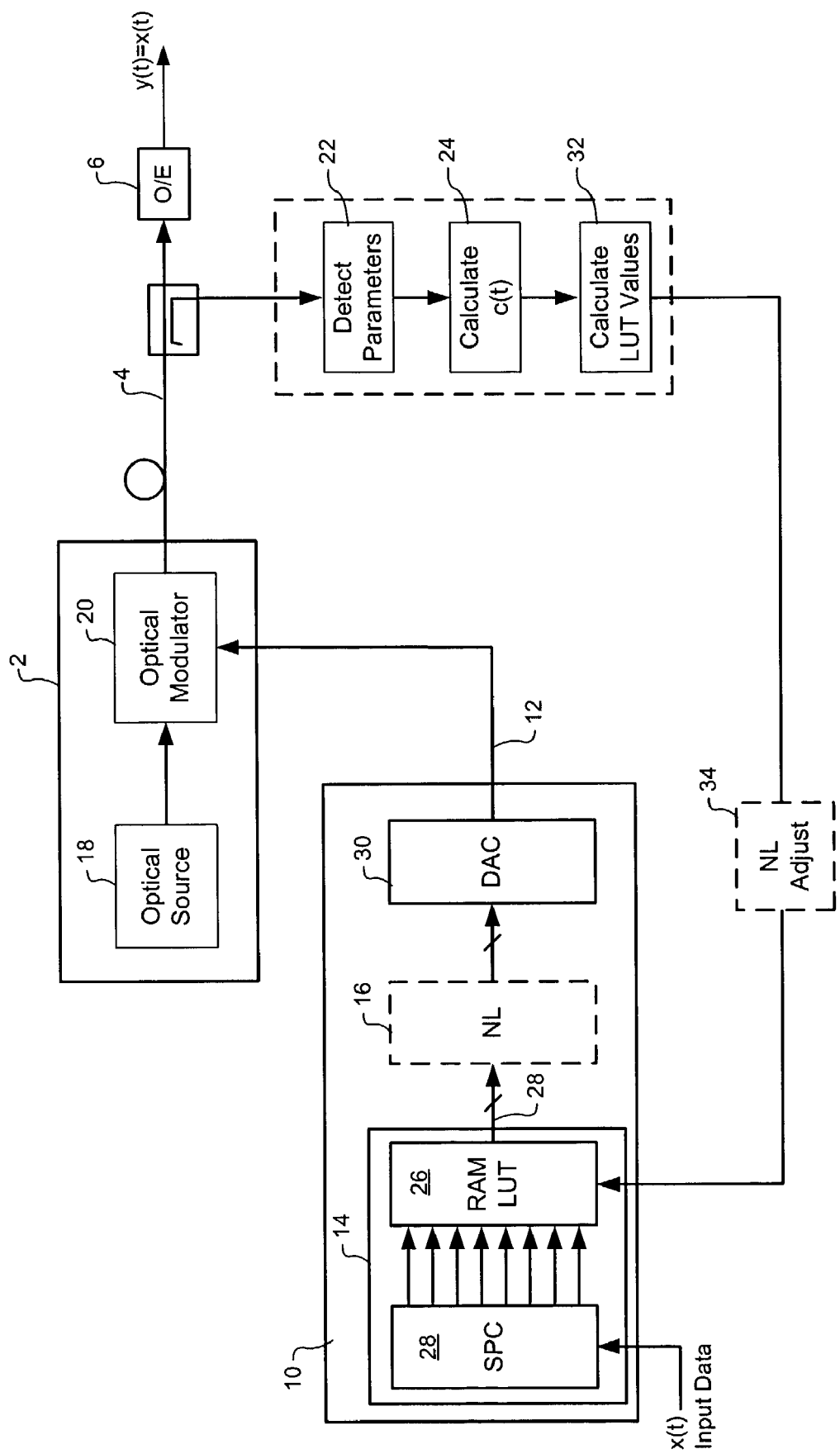
FIG. 4 is a block diagram schematically illustrating principal components and operations of a compensation processor in accordance with a second embodiment of the present invention.

As mentioned above, the digital filter 14 may be implemented in a variety of ways. FIG. 4 schematically illustrates an embodiment in which the digital filter 14 is implemented using a RAM LUT 26. This technique exploits the fact that the input signal x(t) is a substantially undistorted binary signal, in which successive bits can be unambiguously discriminated. This greatly simplifies the problem of digitally filtering the input signal x(t), because a direct relationship can be defined between the input signal x(t) and the predistorted signal $x^1(t)$ 12.

As shown in FIG. 4, successive bits of the input signal x(t) are latched through a serial-to-parallel converter 28 (e.g., a shift register) which converts the serial bit stream into a parallel bit stream having a width of N bits. In the illustrated embodiment N=8, it being understood that other values of N may be used as desired. The parallel data stream is then used to access a random access memory (RAM) look-up table 26 having $2^N$ registers (not shown).

Because the RAM LUT 26 performs a substantially linear filtering function, it is possible to construct the LUT 26 as a set of two or more Random Access Memory blocks (not shown), if desired. In this case, each RAM block stores a respective portion of the desired numerical value 28 of the predistorted signal component. Thus the outputs generated from each RAM block can be summed, in a conventional manner, to produce the desired numerical value 28. This arrangement allows the LUT 26 to be larger than can conveniently be accommodated within a single RAM block.

Each register of the look-up table 16 contains at least one digital number representing the analog value of the predistorted signal $x^1(t)$ 12, which has been previously calculated for a unique set of N bits. Accordingly, as the input serial bit stream is latched through the serial-to-parallel converter 14, a stream of successive digital values 28 of the predistorted signal 12 are output from the look-up table 16. This stream of digital values 28 can then be converted into the corresponding analog predistorted signal $x^1(t)$ 12 using a digital-to-analog converter 30. The analog predistorted signal $x^1(t)$ 12 can then be converted into the corresponding predistorted optical signal $X^1_{OPT}(W)$ by means of a conventional electrical to optical converter 2, as described above.

Various methods may be used to calculate each of the digital values stored in the look-up table 16. In the example of FIG. 4, the optical signal at or near the receiver end of the optical link 4 is monitored (at 22) to detect signal quality parameters and a compensation function c(t) which optimizes the detected parameters derived (at 28), as described above with respect to FIG. 3.

Because chromatic dispersion causes a time domain distortion of an input signal, the instantaneous value of the analog predistorted input signal 12 at a particular instant (t) will necessarily be a function of the analog waveform of the input data signal x(t) within a time window that brackets the instant in question. The width of the time window, measured in symbols, will generally be a function of the maximum dispersion (D) for which compensation is to be provided; the bandwidth (B) of the optical signal; and the symbol interval (S) of the optical signal. For example, consider an optical communications system in which the transmitter generates an optical signal having a bandwidth of B nanometers and a symbol interval of S picoseconds/symbol. In this case, the maximum dispersion (D) that can be compensated is given by the equation:

$$D = N \cdot \frac{S}{B},$$

where N is the width of the time window, measured in symbols. It will be appreciated that the selected value of N will limit the maximum dispersion (D) that can be effectively compensated. In general, the value of N will be selected based on the expected maximum dispersion of the optical communications system.

In the example of FIG. 4, the look-up table uses N=8 successive bits of the input signal x(t) to reference successive values of the predistorted signal. In this case, the time window used for calculating each value of the predistorted signal spans a total of N=8 symbols, so that the total dispersion that can be compensated by the system of FIG. 3 will be given by:

$$D = 8 \cdot \frac{S}{B}$$

Following the discussion above, it will be seen that each value stored in the look-up table 16 can readily be calculated (at 32) by applying the calculated compensation function to each one of the $2^N$ possible N-bit sequences. For each N-bit sequence, the calculated look-up table value would then be stored in the RAM look-up table 16 register that is indexed by the N-bit sequence in question. This process will result in the look-up table 16 being loaded with pre-calculated values of the predistorted signal 12 which will be accessed, in sequence, as successive bits of the input data signal x(t) are latched through the serial-to-parallel converter 14.

In some instances, it may be advantageous to arrange the RAM LUT 26 to output more than one numerical value 18 of the predistorted signal 12 for each symbol of the input signal x(t). This can readily be accomplished by calculating the required numerical values 18 for each N-bit sequence, and storing the resulting set of numerical values in the appropriate register. Consequently, as each bit of the input signal x(t) is latched through the serial-to-parallel converter 28, all of the numerical values calculated for each unique N-bit sequence will be output, in an appropriate sequence, from the RAM LUT 26.

As may be seen in FIG. 4, the non-linear compensator 16 may be implemented as a second look-up table positioned between the dispersion compensation look-up table 26 and the digital-to-analog converter 30. Alternatively, the look-up table values calculated (at 32) using the compensation function c(t) can be adjusted (at 34) based on the known non-linearities of the optical modulator 20 and/or optical-to-electrical converter 6. In this case, values 28 obtained by accessing the RAM look-up table 26 will combine compensation for both dispersion and nonlinearities.

In the embodiments of FIGS. 3 and 4, a single compensation processor path is provided for generating the predistorted signal $x^1(t)$ 12 based on the input signal x(t). As will be appreciated, such an arrangement is suitable for modulating a single dimension (e.g., either amplitude or phase) of the input data stream x(t). Accordingly, the predistorted signal $x^1(t)$ 12 of the embodiments of FIGS. 3 and 4 will comprise an amplitude or phase modulated version of the original input data stream x(t). However, the system transfer function H(w) of the optical communications system will normally be complex, so that an optical signal traversing the communications system will suffer distortions in both phase and amplitude. This issue is addressed by the embodiment of FIG. 5.

Figure 5:
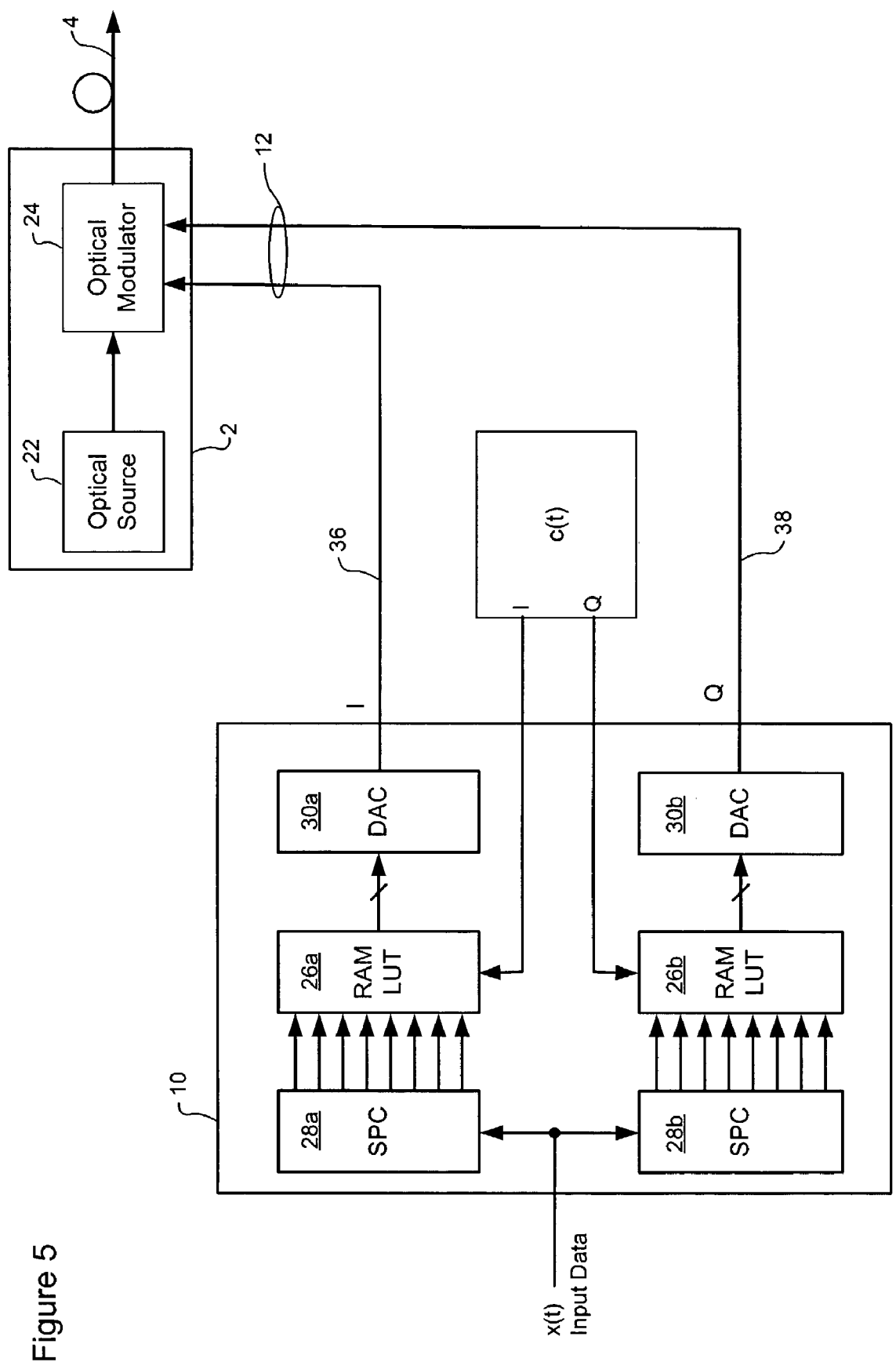
FIG. 5 is a block diagram schematically illustrating principal components and operations of a compensation processor in accordance with a third embodiment of the present invention.
Figure 6:
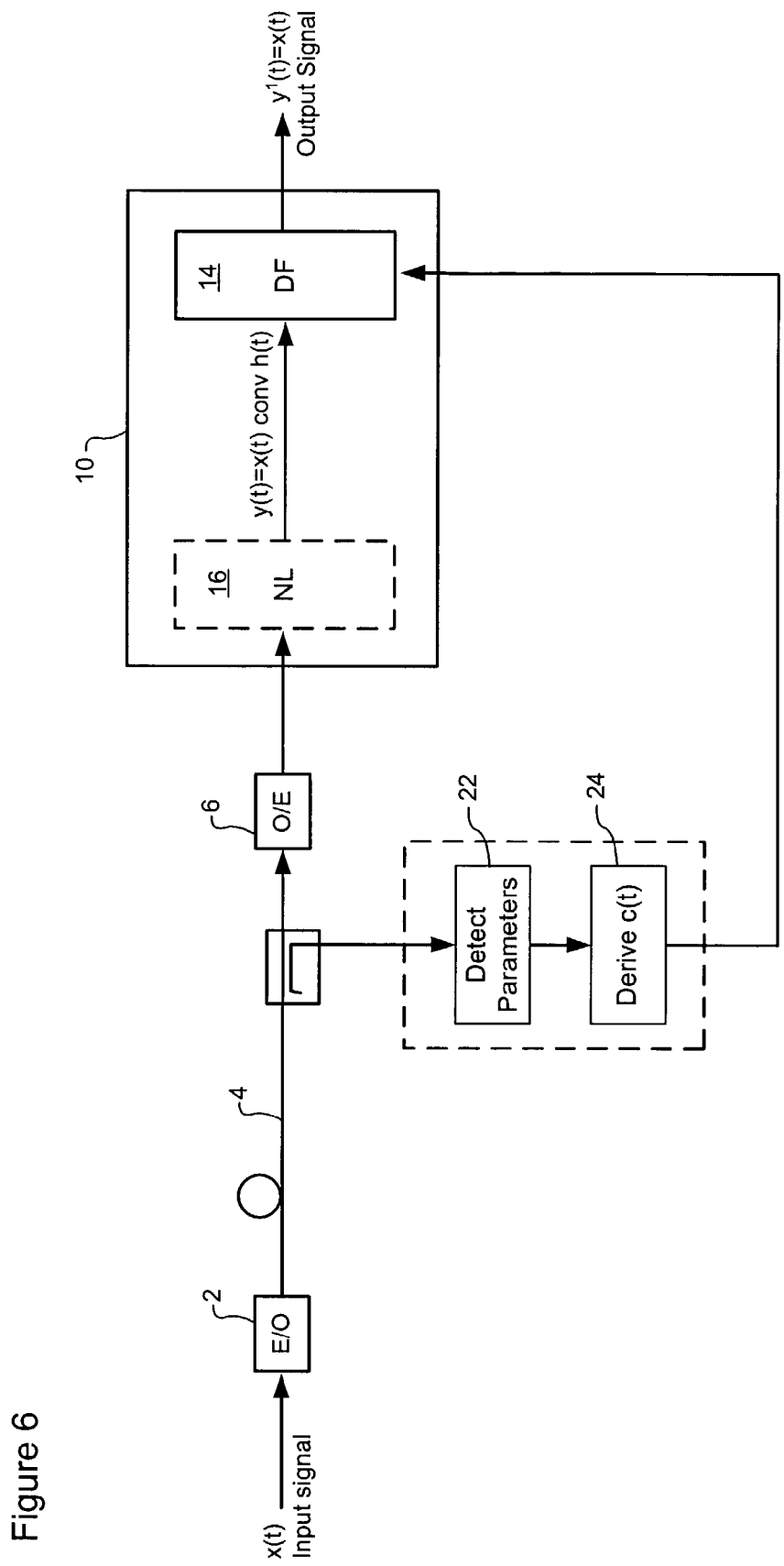
FIG. 6 is a block diagram schematically illustrating principal components and operations of a compensation processor in accordance with the present invention, implemented at a receiving end of an optical communications system.

FIG. 5 is a block diagram schematically illustrating an embodiment of the present invention in which a multi-dimensional compensation processor 10 is used to compensate complex system transfer function effects. In general, the multi-dimensional compensation processor 10 provides an independent compensation path for each dimension of the communications system for which compensation is to be provided. In the embodiment of FIG. 5, it is desired to provide compensation for both amplitude and phase distortions, and therefore the multi-dimensional compensation processor 10 comprises a pair of independent compensation paths. In this case, a pair of compensation paths generate respective output signals I and Q (at 36 and 38) that represent respective orthogonal (Cartesian) components of the predistorted signal 12. The two output signals I and Q are then supplied to a suitable multi-dimensional optical modulator 24 capable of modulating the amplitude and phase of light generated by the optical source 22 in response to the signal components I and Q of the predistorted signal 12.

Various optical modulators capable of providing this functionality are known in the art, such as, for example, Mach Zehnder modulators.

As will be appreciated, the multi-dimensional compensation processor 10 can be implemented using multiple compensation paths to generate the predistorted signal $x^1(t)$ 12 in any desired format, such as, for example, polar coordinates. The only limitation here is that a suitable optical modulator 24 must be provided for modulating the appropriate optical components in response to the signal components generated by the multi-dimensional compensation processor 10.

The embodiment(s) of the invention described above is(are) intended to be exemplary only. The scope of the invention is therefore intended to be limited solely by the scope of the appended claims.

We claim:

1. A method of compensating optical dispersion of a communications signal conveyed through an optical communications system, the method comprising steps of:
   determining a compensation function that substantially mitigates the chromatic dispersion imparted to the communications signal by the optical communications system;
   digitally processing an electrical input signal to be conveyed through the optical communications system, using the compensation function, to generate a predistorted electrical signal; and
   converting the predistorted electrical signal into a corresponding predistorted optical signal for transmission through the optical communications system;
   wherein the step of determining a compensation function comprises steps of:
   measuring a performance parameter related to the optical dispersion; and
   calculating respective values of one or more parameters of the compensation function that optimizes the measured performance parameter.

2. A method as claimed in claim 1, wherein the step of measuring the performance parameter comprises a step of measuring any one or more of:
   net chromatic dispersion at one or more wavelengths;
   a bit error rate;
   a signal-to-noise ratio;
   an eye-opening ratio;
   a stimulus response; and
   a probability distribution.

3. A method as claimed in claim 1, wherein the step of measuring the performance parameter comprises steps of:
   sampling the optical signal received through the optical communications system; and
   calculating an error function indicative of a difference between the sampled optical signal and a predetermined reference.

4. A method as claimed in claim 1, wherein the step of digitally processing the electrical input signal comprises a step of digitally filtering the electrical input signal using any one of:
   a Fast Fourier Transform (FFT) filter;
   a Finite Impulse Response (FIR) filter; and
   an Infinite Impulse Response (IIR) filter.

5. A method as claimed in claim 1, wherein the step of digitally processing the electrical input signal comprises steps of:
   generating successive digital values of the predistorted signal, based on the electrical input signal and the compensation function; and converting each successive digital value into a corresponding analog value of the predistorted signal.

6. A method as claimed in claim 5, wherein the predistorted signal is represented by two or more orthogonal components, and the step of
generating successive digital values of the predistorted signal comprises a step of generating successive corresponding digital values of each component.

7. A method as claimed in claim 5, wherein the electrical input signal comprises a substantially undistorted binary signal, and wherein the step of generating successive digital values of the predistorted signal comprises steps of:
calculating a respective digital value of the predistorted signal corresponding to each one of a set of predetermined N-bit sequences;
storing each calculated digital value in a look-up table; and
extracting a plurality of successive digital values of the predistorted signal from the look-up table using the binary signal.

8. A method as claimed in claim 7, wherein the set of predetermined N-bit sequences encompasses all possible sequences of N-bits.

9. A method as claimed in claim 7, wherein the step of extracting a plurality of successive digital values of the predistorted signal comprises steps of:
converting the binary signal into a series of N-bit words;
using each N-bit word as an index value to access a respective register of the look-up table.

10. A method as claimed in claim 9, wherein the step of extracting a plurality of successive digital values of the predistorted signal comprises a step of extracting at least one numerical value of the predistorted signal for each N-bit word.

11. A method as claimed in claim 7, wherein the number (N) of bits within each sequence is based on any one or more of:
an expected maximum dispersion of the optical communications system; and
an expected response time of the look-up table.

12. A method as claimed in claim 7, wherein the steps of calculating respective digital values of the predistorted signal and storing the calculated numerical values in a look-up table are repeated at predetermined intervals.

13. A method as claimed in claim 5, wherein the step of generating successive digital sample values of the predistorted signal comprises generating the sample values at a sample rate that satisfies the Nyquist criterion for a data rate of the electrical input signal.

14. A method as claimed in claim 1, wherein the step of deriving a compensation function is performed during a start-up of the optical communications system.

15. A method as claimed in claim 1, wherein the step of deriving a compensation function is repeated at predetermined intervals.

16. A dispersion compensation system for compensating optical dispersion of a communications signal conveyed through an optical communications system, the dispersion compensation system comprising:
a processor for deriving a compensation function that substantially mitigates the dispersion imparted to the communications signal by the optical communications system, the processor comprising:
a detector for measuring a performance parameter related to the optical dispersion; and
a calculation engine for calculating respective values of one or more parameters of the compensation function that optimizes the measured performance parameter;
a compensation processor for digitally processing an electrical input signal to be conveyed through the optical communications system, using the compensation function, to generate a predistorted electrical signal; and
an optical modulator for converting the predistorted electrical signal into a corresponding predistorted optical signal for transmission through the optical communications system.

17. A system as claimed in claim 16, wherein the processor is implemented remote from the compensation processor.

18. A system as claimed in claim 16, wherein the detector is adapted to measure any one or more of:
net chromatic dispersion at one or more wavelengths;
a bit error rate;
a signal-to-noise ratio; and
an eye-opening ratio.

19. A system as claimed in claim 16, wherein the detector is adapted to:
sample the optical signal received through the optical communications system; and
calculate an error function indicative of a difference between the sampled optical signal and a predetermined reference.

20. A system as claimed in claim 16, wherein the compensation processor comprises any one of:
a Fast Fourier Transform (FFT) filter;
a Finite Impulse Response (FIR) filter; and
an Infinite Impulse Response (IIR) filter.

21. A system as claimed in claim 16, wherein the compensation processor comprises:
a look-up-table for calculating successive numerical values of the predistorted signal, based on the electrical input signal and the compensation function; and
a digital-to-analog converter for converting each successive numerical value into a corresponding analog value of the predistorted signal.

22. A system as claimed in claim 21, wherein the predistorted signal is represented by two or more orthogonal components, and the look-up-table comprises a respective look-up-table for generating each component.

23. A system as claimed in claim 21, wherein the electrical input signal is a substantially undistorted serial binary signal, and the compensation processor further comprises, a serial-to-parallel converter for converting the binary signal into a series of N-bit words, each N-bit word being supplied to the look-up-table as an index value to access a respective register of the look-up table.

24. A system as claimed in claim 23, wherein at least one numerical value of the predistorted signal is extracted from the look-up-table for each N-bit word.

25. A system as claimed in claim 23, wherein the number (N) of bits within each sequence is based on any one or more of:
an expected maximum dispersion of the optical communications system; and
an expected response time of the look-up-table.

26. A system as claimed in claim 21, wherein the look-up table comprises:
two or more memory blocks for storing a respective portion of each numerical value of the predistorted signal; and a summation circuit for summing the respective portions of the numerical value output from each memory block.

27. A dispersion compensator for compensating optical dispersion of a communications signal conveyed through an optical communications system, the dispersion compensator being implemented in a transmitter of the optical communications system, and comprising:
- a compensation processor for digitally processing an electrical input signal to be conveyed through the optical communications system, using a predetermined compensation function, to generate a predistorted electrical signal for modulating an optical source of the transmitter;
- such that modulation of the optical source generates a corresponding predistorted optical signal for transmission through the optical communications system;
- wherein the compensation processor comprises any one of:
  - a Fast Fourier Transform (FFT) filter:
  - a Finite Impulse Response (FIR) filter; and
  - an Infinite Impulse Response (IIR) filter:
- and wherein the compensation processor comprises:
  - a look-up-table for calculating successive numerical values of the predistorted signal, based on the electrical input signal and the compensation function; and
  - a digital-to-analog converter for converting each successive numerical value into a corresponding analog value of the predistorted signal.

28. A dispersion compensator as claimed in claim 27, wherein the predistorted signal is represented by two or more orthogonal components, and the look-up-table comprises a respective look-up-table for generating each component.

29. A dispersion compensator as claimed in claim 27, wherein the electrical input signal is a substantially undistorted serial binary signal, and the compensation processor further comprises, a serial-to-parallel converter for converting the binary signal into a series of N-bit words, each N-bit word being supplied to the look-up-table as an index value to access a respective register of the look-up table.

30. A dispersion compensator as claimed in claim 29, wherein at least one numerical value of the predistorted signal is extracted from the look-up-table for each N-bit word.

31. A dispersion compensator as claimed in claim 29, wherein the number (N) of bits within each sequence is based on any one or more of:
- an expected maximum dispersion of the optical communications system; and
- an expected response time of the look-up-table.

* * * * *